United States Patent [19]

Fauth, Jr. et al.

[11] 3,957,575

[45] May 18, 1976

[54] MECHANICAL DESIGN OF A LIGHT WATER BREEDER REACTOR

[75] Inventors: William L. Fauth, Jr., Germantown, Md.; Daniel S. Jones; George J. Kolsun, both of Pittsburgh, Pa.; John G. Erbes, San Jose, Calif.; John J. Brennan, Bethel Park, Pa.; James A. Weissburg, Pittsburgh, Pa.; John E. Sharbaugh, Acme, Pa.

[73] Assignee: The United States of America as represented by the United States Energy Research and Development Administration, Washington, D.C.

[22] Filed: Apr. 16, 1974

[21] Appl. No.: 461,475

[52] U.S. Cl. .................................. 176/18; 176/28; 176/61; 176/78
[51] Int. Cl.² ...................... G21G 1/02; G21C 3/28; G21C 19/00
[58] Field of Search .................. 176/17, 18, 40, 78, 176/28, 61

[56] References Cited
UNITED STATES PATENTS

| | | | |
|---|---|---|---|
| 3,182,003 | 5/1965 | Thorp et al. ........................... | 176/78 |
| 3,285,821 | 11/1966 | Brubaker .............................. | 176/17 |
| 3,351,532 | 11/1967 | Raab et al. ............................ | 176/17 |

OTHER PUBLICATIONS

"Hearings before the Joint Committee on Atomic Energy . . . on Naval Nuclear Propulsion Program," Apr. 23, 1969, Appendix 7.

*Primary Examiner*—Samuel W. Engle
*Assistant Examiner*—S. A. Cangialosi
*Attorney, Agent, or Firm*—John A. Horan; Kenneth L. Gage

[57] ABSTRACT

In a light water reactor system using the thorium-232 — uranium-233 fuel system in a seed-blanket modular core configuration having the modules arranged in a symmetrical array surrounded by a reflector blanket region, the seed regions are disposed for a longitudinal movement between the fixed or stationary blanket region which surrounds each seed region. Control of the reactor is obtained by moving the inner seed region thus changing the geometry of the reactor, and thereby changing the leakage of neutrons from the relatively small seed region into the blanket region.

The mechanical design of the Light Water Breeder Reactor (LWBR) core includes means for axially positioning of movable fuel assemblies to achieve the neutron economy required of a breeder reactor, a structure necessary to adequately support the fuel modules without imposing penalties on the breeding capability, a structure necessary to support fuel rods in a closely packed array and a structure necessary to direct and control the flow of coolant to regions in the core in accordance with the heat transfer requirements.

4 Claims, 24 Drawing Figures

Fig. 1

| TYPE I MODULE | 3 REQ'D | ⬡ |
| --- | --- | --- |
| TYPE II MODULE | 3 REQ'D | ⬠ |
| TYPE III MODULE | 6 REQ'D | ⬢ |
| TYPE IV MODULE | 9 REQ'D | ⌂ |
| TYPE V MODULE | 6 REQ'D | △ |

MECHANICAL DESIGN OF A LIGHT WATER BREEDER REACTOR

BACKGROUND OF THE INVENTION

The present invention was made or conceived in the course of, or under, a contract with the United States Atomic Energy Commission.

FIELD OF THE INVENTION

The invention relates to nuclear reactors and more particularly a Light Water Breeder Reactor (LWBR) which utilizes uranium-233 as a fissile material and thorium-232 as a fertile material.

DESCRIPTION OF THE PRIOR ART

U.S. Pat. No. 2,708,656 issued to E. Fermi et al. on May 17, 1955 sets forth the general principles and nomenclature associated with nuclear reactors and is hereby incorporated by reference. Reference is also made to "Hearings" before the Joint Committee on Atomic Energy, Apr. 23, 1969 released on June 20, 1969 which describes a preliminary LWBR design concept. Most reactors designed and built today have utilized uranium-235 (U-235) as the fissionable material since it is the only naturally occuring material with adequate nuclear characteristics to produce a nuclear chain reaction. However, the amount of U-235 available is quite limited since it represents only seven tenths of one percent of naturally occuring uranium. The total energy recently available from potentially assured U.S. reserves of economically recoverable U-235 is less than the energy potentially available from known United States fossil fuel reserves. Thus, plans for a nuclear power industry which make a significant contribution to total energy resources have looked to two fertile materials, uranium-238 (U-238), which makes up over 99 percent of all natural uranium, and thorium.

While these materials themselves cannot be used to produce a nuclear chain reaction, they will under radiation be converted into the chain reacting fissile fuels plutonium-239 or uranium-233 respectively. The energy potentially available from these fertile nuclear materials is many times greater than an energy potential of fossil fuel resources. Present day reactors convert some fertile U-238 or thorium into fissile material, however, the overall nuclear resource utilization is only one to two percent of the energy potentially available from the mined ore. It is theoretically possible to design power reactors and create more fissile fuel from fertile nuclear material than they burn during operation. Such power reactors are called breeder reactors. Breeder reactors would make a major fraction of the energy potentially available from fertile nuclear materials available for power production.

A Light Water Breeder Reactor (LWBR) utilizes the well established light water reactor technology upon which the present growth of the nuclear utility industry is based. Although work has been proceeding on a Liquid Metal Fast Breeder Reactor (LMFBR), the achievement of a practical LMFBR appears to be one to two decades in the future. Many problems such as liquid metal technology, high operating temperatures, and materials limitations need to be overcome prior to the successful operation of a LMFBR.

Thus, it is apparent that a need readily exists for a breeder reactor using more than the seven tenths of one percent energy presently available which can be operating within the next decade. Since the LWBR program is aimed at developing and demonstrating the necessary technology to breed by carrying out actual breeding with existing light water reactor technology, immediate utilization of the energy potentially available from fertile nuclear materials is made available. The LWBR indicates that it is possible to breed in a light water moderated and cooled reactor system using a thorium-232 — uranium-233 system in conjunction with a seed-blanket modular concept.

In this breeder the amounts of this material available at the end of core life is expected to be sufficiently greater than that originally put into the reactor to offset the loss of fissile material experienced during fuel reprocessing and refabrication of a replacement core. A self-sustaining breeding fuel cycle would thus be obtained in which the only fuel makeup is fertile thorium, without the need for additional fuel makeup. This is the only known approach significantly increasing the utilization of nuclear fuel and light water thermal reactor plants beyond the one to two percent of the potential energy of uranium and thorium or resources that can be made available for power production using present types of light water reactors.

SUMMARY OF THE INVENTION

It is, therefore, a primary object of this invention to develop the technology necessary to significantly improve the fuel utilization of light water thermal reactors.

It is a further object of this invention to provide a breeder reactor core which can be installed in existing and future pressurized water reactors.

It is another object of this invention to provide a reactor mechanical design of means for axially positioning of movable fuel modules.

It is another object of this invention to provide a reactor structure necessary to adequately support fuel rods in a closely packed array.

It is another object of the present invention to provide a reactor structure necessary to direct and control the flow of coolant to regions in the core in accordance with the heat transfer requirements therein.

The reactor which incorporates the principles of this invention is a light water reactor system using the thorium-232 - uranium-233 fuel system in a seed-blanket modular core configuration. The modules are arranged in a symmetrical array surrounded by a reflector blanket region. The seed regions are disposed for a longitudinal movement between the fixed or stationary blanket region which surrounds each seed region. U.S. Pat. No. 3,640,844, issued to Richard C. Shank et al. on Feb. 8, 1972, describes the particular module placement and power flattened blanket regions and is hereby incorporated by reference. Control of the reactor is obtained by moving the inner seed region thus changing the geometry of the reactor, and thereby changing the leakage of neutrons from the relatively small seed region into the blanket region. British Pat. No. 1,332,773, filed on Mar. 2, 1975, claiming the priority date of U.S. Patent application Ser. No. 124,150(70), filed by Cohen et al. on Mar. 15, 1971, now abandoned further describes the movable fuel module concept and is hereby incorporated by reference.

The present invention describes the mechanical design of the Light Water Breeder Reactor (LWBR) and includes means for axially positioning the movable fuel assemblies to achieve the neutron economy required of a breeder reactor, a structure necessary to adequately support the fuel modules without imposing penalties on the breeding capability, a structure necessary to support fuel rods in a closely packed array and a structure necessary to direct and control the flow of coolant to regions in the core in accordance with the heat transfer requirements. By eliminating nonabsorbers from the core during the operation of the reactor, the neutron economy of the reactor is enhanced.

DESCRIPTION OF THE PREFERRED EMBODIMENT

The Light Water Breeder Reactor (LWBR) can be understood by reference to the figures described above. Reference is made to U.S. Pat. No. 3,060,111 issued to J. Sherman et al. on Oct. 23, 1962 illustrating a seed-blanket nuclear reactor with associated core support structure. U.S. Pat. No. 3,219,535 issued to T. R. Robbins, Oct. 23, 1969 illustrates variable geometry control of a nuclear reactor. Although specific details and numbers are illustrated, it should be apparent the reactor described is a representative embodiment of the inventive features of a LWBR.

Figure 1:
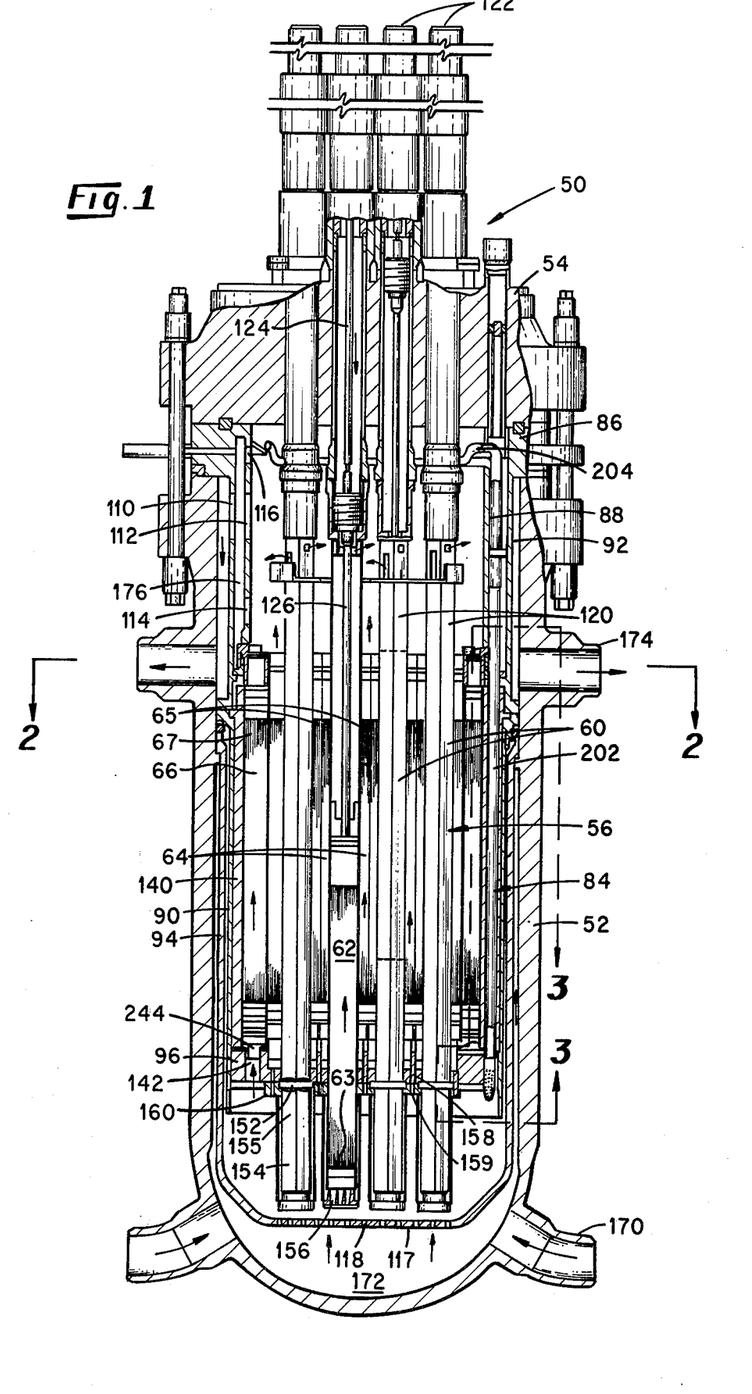
FIG. 1 is a vertical sectional view of a nuclear reactor constructed in accordance with the present invention.
Figures 2, 3:
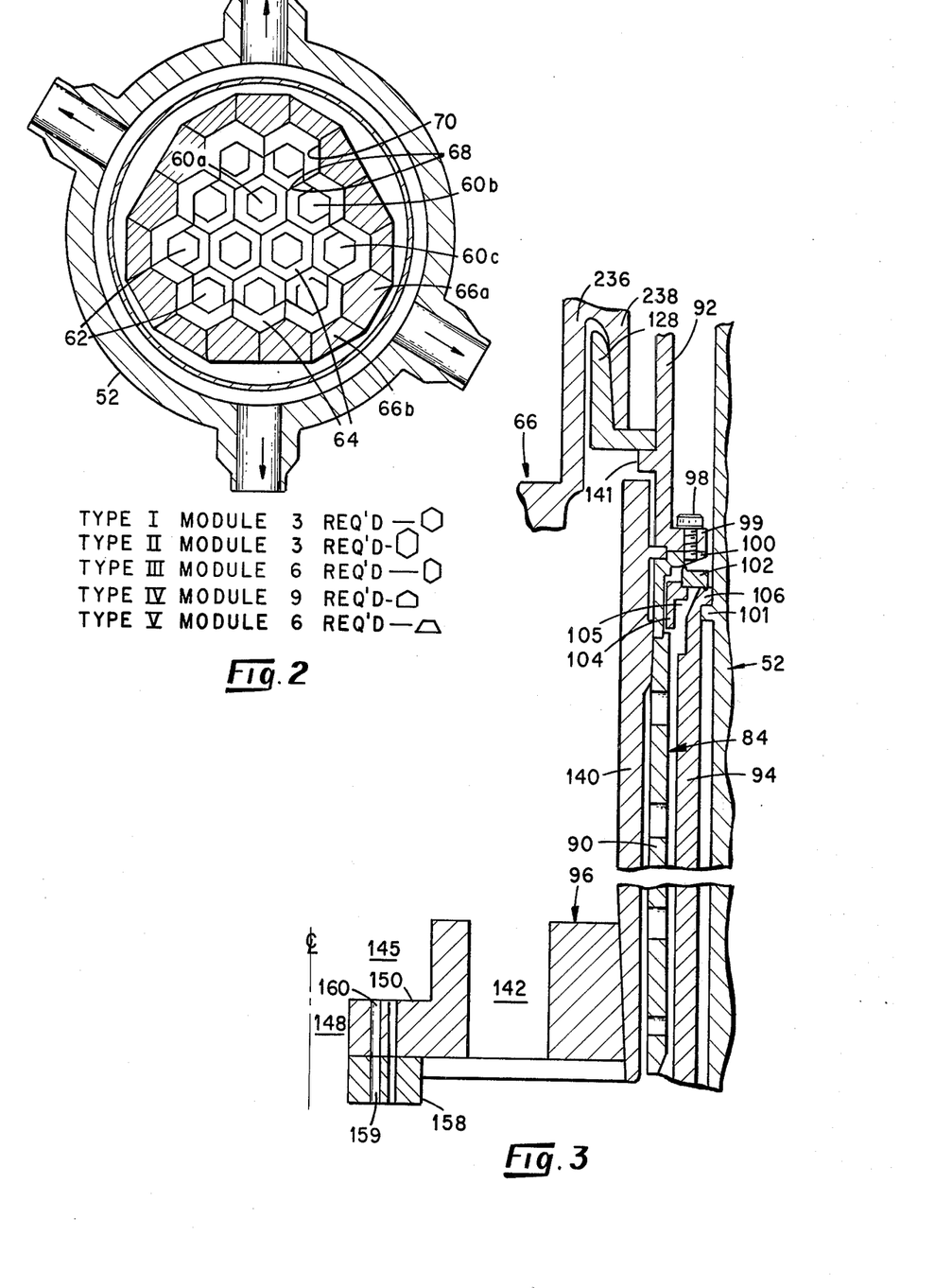
FIG. 2 is a horizontal sectional view taken along the top of the reactor core at line segment 2—2.
FIG. 3 is a fragmentary view showing that portion of FIG. 1 enclosed by the dot and dash line 3 of FIG. 1.

Referring to FIG. 1 and 2, the LWBR comprises a pressure vessel 50 including a vessel shell 52 and closure head 54 and a core 56 contained in vessel shell 52. The reactor core 56 contains fuel and reflector modules 60 and 66. The fuel modules 60a, 60b and 60c shown in FIG. 2 as Type I, Type II and Type III modules respectively comprise hexagonal-shaped seed assemblies 62 having seed fuel rods 63 disposed generally within the fuel module center and generally hexagonal blanket assemblies 64 having blanket fuel rods 65 disposed around seed assemblies 62. The reflector modules 66a and 66b shown in FIG. 2 as Type IV and Type V modules respectively have reflector fuel rods 67 surrounding the periphery of the grouped fuel modules 60.

As shown in FIG. 2 there are twelve movable seed assemblies 62, twelve blanket assemblies 64, and fifteen reflector assemblies 66. The generally hexagonal fuel modules 60 have each side arranged in a juxtaposed relationship with a side 68 of the adjacent fuel modules 60 or a side 70 of the reflector modules 66. The seed assemblies 62 are moved longitudinally with respect to blanket assemblies 64 by control mechanism 122.

Referring to FIG. 1 and 3, a core cage assembly 84 comprises a core barrel support flange 86, a holddown barrel 88, a lower core barrel 90, upper core barrel 92, inlet baffle shield barrel 94, and a bottom plate assembly 96. The upper core barrel 92 is integrally formed to and supported from flange 86 which is clamped between the vessel head 54 and the vessel shell 52 by bolts 97. The holddown barrel 88 radially interior the upper core barrel 92 is formed separately from flange 86, but fixedly attached thereto. Upper core barrel 92 and lower core barrel 90 are fastened together by bolts 98 extending through external flanges 99 and 100 formed respectively on the bottom of the upper core barrel 92 and the top of the lower core barrel 90. The inlet baffle shield barrel 94 rests on flange 106 which rests on ledge 101 formed integrally on the side of the shell 52. The upper core barrel 92 rests on the upper flange 100 of the lower core barrel 90 which rests on a belleville spring 102 which is supported by the inlet baffle shield barrel 94. A seal ring 104 fits within an indentation 105 on the interior of inlet baffle shield barrel 94 to maintain spring 102 in place. The upward hydraulic forces on the reflector modules 66 caused by the water flowing through the reflector modules 66 are resisted by the holddown barrel 88 which transmits the hydraulic forces to the closure head 54.

The upper section of the barrels 88 and 92 contain a large number of vertical coolant slots 110 and 112 which are located respectively circumferentially therearound in spaced relationship to one another to allow upper core barrel 92 and flange 88 to expand differentially without generating high thermal stresses. A ring of circumferentially spaced holes 114 and 116 is provided above and below slots 112 of holddown barrel 88 to increase the exit flow area which satisfies natural circulation requirements. after loss of flow accidents and also satisfies emergency coolant injection requirements after loss coolant accidents. The holes 114 and 116 in the holddown barrel are sized and located so that they direct streams of coolant at each seed and blanket assemblies 62 and 64. U.S. Pat. application Ser. No. 134,109 filed by Richard Atherton et al. on Apr. 20, 1971, Notice of Allowability Mar. 8, 1973 describes this safety coolant injection and distribution system for a LWBR. The inlet baffle shield barrel 94 has an integral flow baffle 117 formed therewith having a plurality of openings 118 which allows coolant to circulate therethrough into modules 60 and 66.

The blanket assemblies 64 of fuel modules 60 are all supported in a hanging position, with lateral support provided by the core barrel assembly 84, by a plurality of blanket support tubes 120 which are suspended from the closure head 54. The seed assemblies 62 are supported by the control mechanisms 122 through a lead screw 124 and seed support shaft 126 which move these seed assemblies 62 longitudinally. As shown in FIG. 3, the reflector modules 66 are supported by a seal ring 128 which in turn is supported by ledge 141 internal to the upper core barrel 92.

The core barrel assembly 84 also includes an inner thermal shield 140 and the bottom plate assembly 96. The bottom plate assembly 96 has a plurality of openings 142 therethrough to receive stub tubes 244 of reflector assemblies 66. A plurality of generally hexagonal indentations 145 extend partially through assembly 96 and mirror the fuel module patterns shown in FIG. 2. Round openings 148 are centrally located within hexagonal indentations 145 within the bottom plate assembly 96. The ledge 150 formed between the openings 148 and hexagonal indentations 145 receive the generally hexagonally-shaped lower portion of the blanket assembly 64 of the fuel modules 60. Openings 148 received a round tube extension 152 of the seed assembly 62. A hexagonal seed coolant guide tube 154 integrally connected to the round seed extension 152 forms blanket guide tube extension 155 and extends downwardly through the bottom plate assembly 96. A seed flowmeter 156 is positioned within and interlocked to each seed coolant guide tube 154 located at the base of the fuel modules 60. Blanket flowmeters 158 having a plurality of openings 159 of assembly 96 which exit into blanket coolant channels 160 of assembly 96 and are bolted to the bottom face of bottom plate assembly 96. Flowmeter instrumentation lines (not shown) from flowmeters 156 and 158 are enclosed in a conduit (not shown) which runs along the core cage assembly 84 through flange 86 to a flow nozzle outlet (not shown).

The pressure vessel is provided with four inlet nozzles 170 uniformly spaced thereabout and communicating with a lower plenum chamber 172 defined in vessel shell 52. The coolant flow is supplied by four pumps (not shown) in separate loops which circulate the coolant through the reactor vessel 50 via the path indicated by the directional arrows through assembly 84 and modules 60 and 66 into an upper plenum chamber 176, and exiting through four outlet nozzles 174 (not uniformly spaced). Each outlet nozzle directs coolant through four separate loops each of which contains a pump (not shown) and heat exchanger (not shown). The arrangement of four separate loops each including a separate inlet nozzle 170 and separate outlet nozzle 174 provides an even distribution of flow to the core 56 and promotes additional cooling of the coolant prior to entry to the core 56.

CONTROL SYSTEM

Figure 4A:
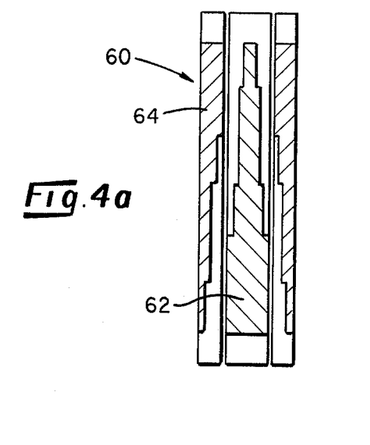
FIG. 4a and 4b are schematic diagrams of a blanket module illustrating the variable geometry nuclear control concept with low and high neutron leakage respectively.
Figure 4B:
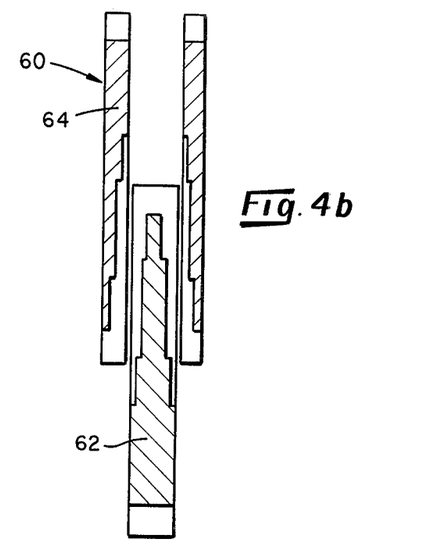

A unique feature of the LWBR core design is that it does not contain any control rods. This is extremely important in a breeder reactor where neutron economy is critical to the breeding capability. As shown in FIGS. 4a and 4b reactivity is controlled by varying the leakage of neutrons from small seed regions 62 into the subcritical blanket regions 64. This is achieved by actually moving the seed assembly 62 so as to change core geometry rather than using conventional parasitic neutron absorbing poisons. With this method of control, which is one of the major advantages of the seed blanket concept, excess neutrons will be absorbed in fertile thorium material and good neutron economy will be achieved. The reactivity worth of the movable seed is increased by using partial links of natural thorium in some of the seed and blanket rods 63 and 65. This concept is clearly shown in FIGS. 4a – 4b which is the subject of the above-cited British Pat. No. 1,332,773, referencing the Cohen et al. patent application identified as Ser. No. 124,150(70). During normal power operation as shown in FIG. 4a all seed assemblies 62 are aligned as a uniform array with the blanket assembly 64. At the beginning of core life, critical operation should occur with the seeds down about two feet lower than the stationary blanket. As the core operates the fuel is moved upward toward a position two feet higher than the blanket at the end of core life. During normal power operation all seeds 62 are aligned as an uniform bank. To shutdown the reactor, the seed assembly 62 is disposed generally below the blanket assembly 64 as shown in FIG. 4b.

Figure 5A:
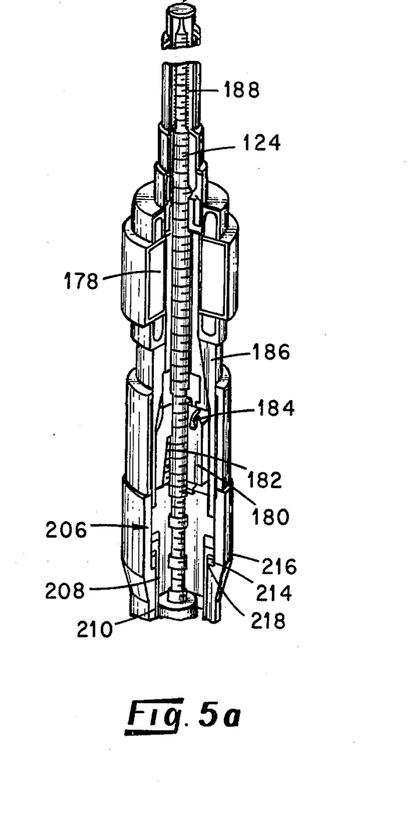
FIG. 5a is a vertical quarter section of a perspective view of the control drive mechanism that raises and lowers the seed assembly.
Figure 5B:
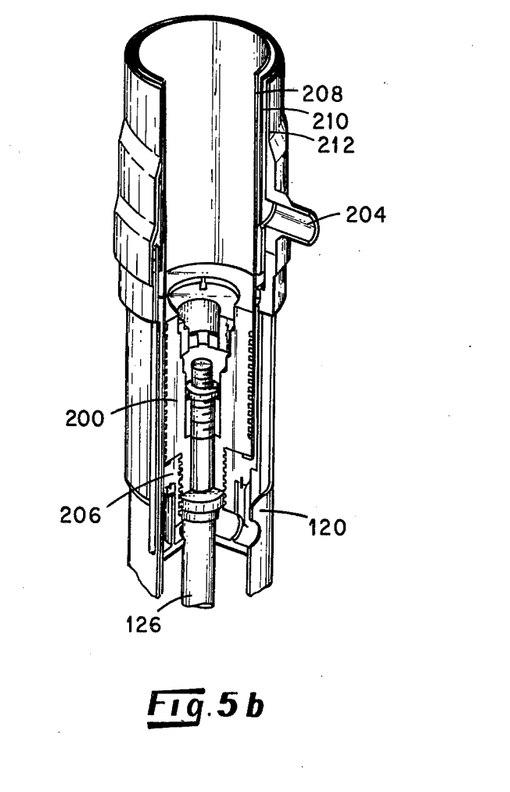
FIG. 5b is an enlarged vertical quarter section of a perspective view of the lower part of the fuel modular system, which combined with FIG. 5a illustrate the fuel module suspension system.

As shown in FIGS. 5a and 5b, axial position of each individual module seed assembly 62 is accomplished by a control mechanism 122 which comprises a motor tube 186, a vessel nozzle 216 affixed to tube 186, position indicating coils 188 located above tube 186, and a collapsible rotor mechanism drive 178, which is connected to a lead screw 124 to support the seed assembly 62 and affixed around tube 186. Safety shutdown is accomplished by deenergizing a drive mechanism stator 178 thus collapsing rotor segment arms 180 and releasing rotor nuts 182 from the lead screw 124. This permits the movable seed region 62 to fall to its least reactive position as shown in FIG. 4b. A continually-engaged-out motion latch 184 is incorporated in the mechanism to provide positive prevention of any unsignaled motion of the seed. U.S. Pat. No. 3,296,081 issued to R. Wildgoose on Jan. 3, 1967 describes in greater detail components of control mechanisms position indicating coils. A net downward force on the seed assembly 62 equal to the weight of the movable fuel is achieved under all conditions of flow by the use of a balance piston 200 within each module 60 to counter balance the upward flow of the coolant through the seed assembly 62. The seed support shaft 126 is attached to the balance piston 200.

The balancing pressure is directed from the lower plenum chamber 172 of the reactor shell to the top of balance piston 200 by the means of a by-pass inlet flow (BIF) supply tube 202 and BIF cross over pipes 204 as illustrated in FIG. 1 and FIG. 5. A buffer cylinder 206 as shown in FIG. 5 is incorporated in the seed assembly 62 to prevent excessive terminal velocity of the seed assembly 62 following release from the mechanism 122.

The module suspension system 206 which is also shown in FIG. 5 and comprises a compression sleeve 208, a breech lock sleeve 210 and a suspension sleeve 212 interlocked to one another and motor tube 186 and which because of the interference imposed during the assembly, exert axial preload forces on one another. The primary functions of the module suspension system 206 are to support the fuel module from the closure head, to provide a sealed path for the by-path inlet flow balancing system flow, and to provide a remotely operable means for disconnecting the fuel module from the closure head. The suspension sleeve 208 has an upper lip 214 which fits inside vessel nozzle 216 and rests on an inward ledge 218 to support the module 60 from vessel head 54. The length and thin walls of the sleeves 206, 208 and 210 allows this suspension system 206 to accommodate the misalignments which can be imposed on this system by its assembly to the blanket region 64 without the occurrence of unacceptably high bending reactions. The axial preloads in the sleeves 206, 208, and 210 are sufficient to prevent the separation at the locations of the required seals due to the applied forces and bending moments. The blanket support tube 120 is formed to be interlocked to the suspension sleeve 208.

The axial flexibility of these sleeves 206, 208, and 210 is also important because it was found that the nominal amount of interference in each component had to be fairly large to insure that the axial preloads were above the minimal allowable values of such conditions of operation. Representative materials from which the module suspension system components could be readily formed are Inconel, 304 CRES, and 348 CRES.

Figure 11:
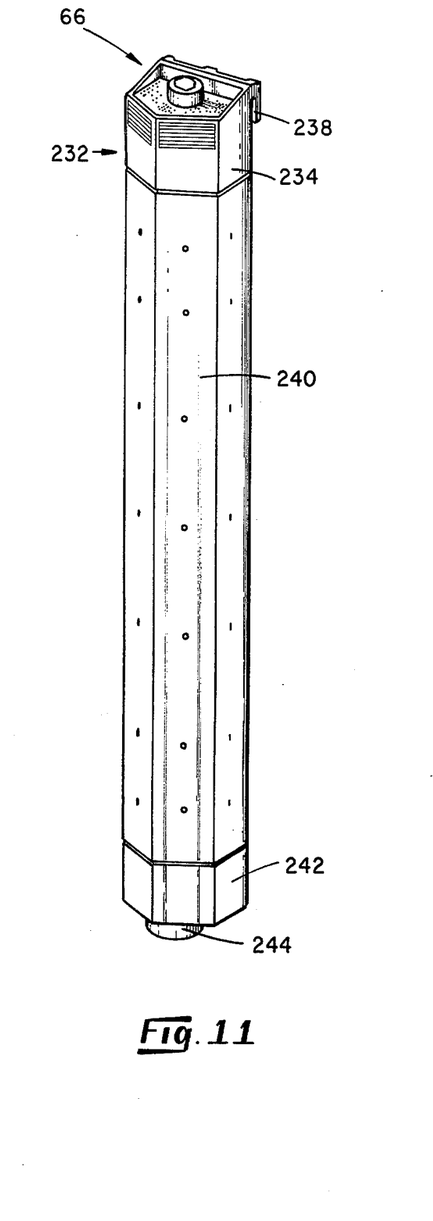
FIG. 11 is a perspective view of a type IV reflector assembly.
Figure 12:
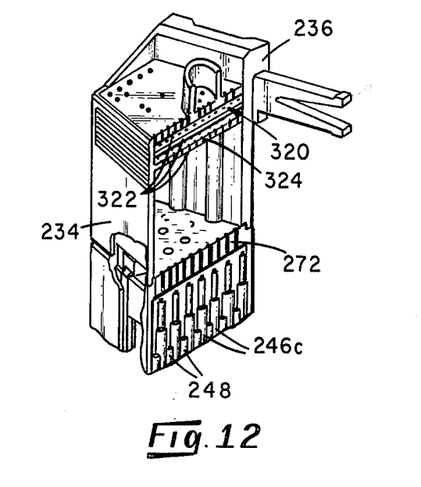
FIG. 12 is an enlarged half-sectional view of the top portion of the reflector assembly shown in FIG. 11.
Figure 13:
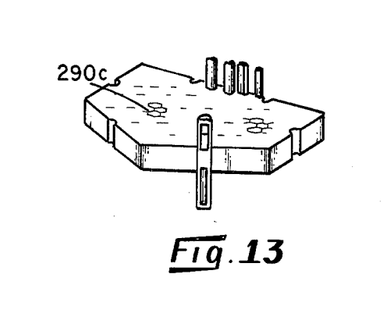
FIG. 13 is an enlarged view of the fuel rods support grid as incorporated in the reflector assembly of FIG. 11.
Figure 14:
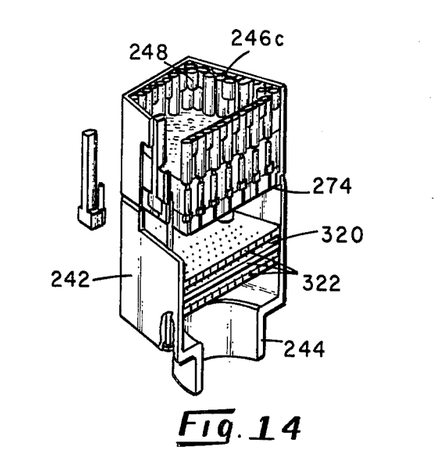
FIG. 14 is an enlarged half-sectional view of the bottom portion of the reflector shown in FIG. 11.

Referring to FIGS. 3, 11 and 12, the reflector modules 66 comprise a seal block assembly 232 having a seal block 234 with a ledge 236 having a downwardly extending lip 238 that engages seal ring 128 to provide top support module 66. A reflector shell tube 240 is affixed to seal block 234. A stub tube assembly 242 having stub tubes 244 which fit into opening 148 of bottom plate assembly 96 to provide lower end alignment for module 66.

FUEL MODULE ASSEMBLIES

As previously noted five types of fuel modules 60a, 60b, 60c, 66a and 66b are used in the core 56 as illustrated in FIG. 2. Type I, II and III, respectively numerals 60a, 60b and 60c, are fuel modules 60 with each containing a movable seed assembly 62 and types IV and V, respectively numerals 66a and 66b, are reflector modules 66 located about the perimeter of the grouped fuel modules 60. All of the fuel within the modules are contained within the approximately 10 ft. length of the cylindrical, zircaloy-4 clad seed and blanket assemblies, and reflector module fuel rods respectively numerals 63, 65 and 67.

The seed fuel rods 63 are 0.306 outside diameter and the fuel consists of solid thorium-oxide pellets of about ninety-six percent theoretical density and solid binary fuel pellets which contain about five weight percent uranium-233 oxide (U-233 $O_2$).

There are two sizes of blanket fuel rods 65, a standard blanket fuel rod 65a which is 0.571 inches outside diameter and a power flattening blanket fuel rod 65b which is 0.526 inch outside diameter. The standard blanket fuel rods 65a are located in the central portion of the blanket assembly 64 and power flattening fuel rods 65b are located in the perimeter of the blanket assembly 64. The power flattening technique is described in the aforecited Shank et al. Patent.

The pitch of the blanket fuel rods 65 is the same in both regions of the module thereby producing a different metal to water ratio in the two fuel zones. The blanket fuel rods 65 also contain solid thorium oxide pellets of 96 percent theoretical density and solid binary fuel pellets which contain from one to three weight percent of U-233 $O_2$. The length of the stack of binary pellets is varied in the seed and blanket fuel rods 63 and 65 to provide the wedge effect necessary for reactivity control as illustrated in FIGS. 4a and 4b and the above cited Cohen et al. Patent Application. The reflector fuel rods 67 containing thorium-dioxide pellets are 0.832 inches outside diameter.

Figure 9:
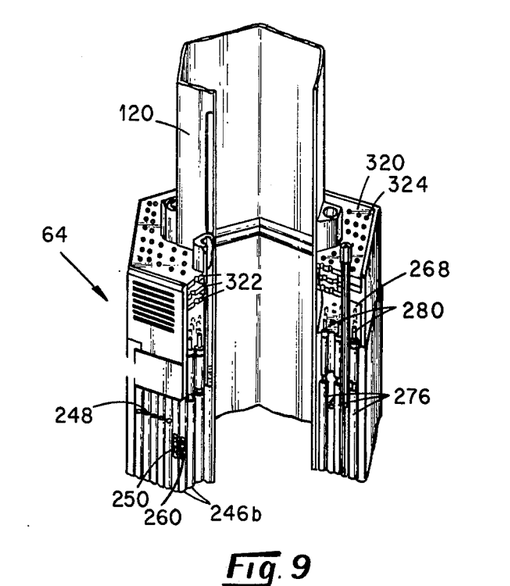
FIG. 9 is an enlarged quarter section view of the top portion of the blanket assembly of FIG. 8.
Figure 10:
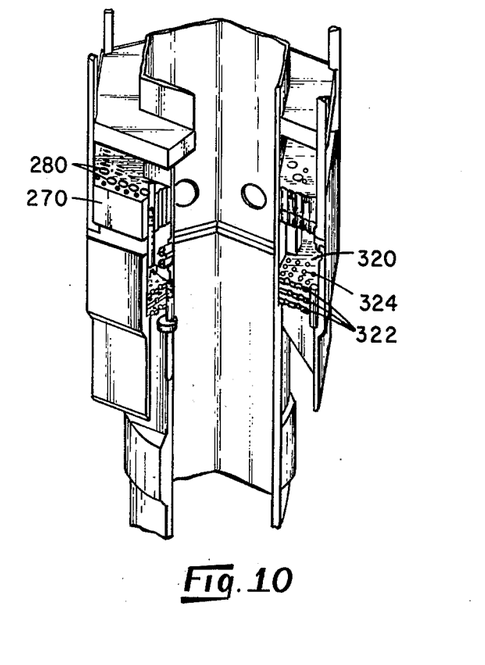
FIG. 10 is an enlarged quarter sectional view of the bottom portion of the blanket assembly of FIG. 8.

Referring to FIGS. 6–14, all of the fuel rods 63, 65 and 67 are long cylindrical rods composed of right, circular cylindrical fuel pellets stacked inside of a hollow thin wall cylindrical cladding tube 246. The tube 246 is welded at both ends to solid cylindrical shoulder end caps 248. A plenum void 250 as shown in FIG. 9, is provided above the fuel stack to accept fission gas released from the fuel matrix and to minimize internal gas pressure. This void 250 necessitates the use of a plenum spring 260 to maintain continuity of the stacked fuel pellets and in the case of nonfree standing cladding 246b and 246c used in the blanket and reflector fuel rods 65 and 67, a support sleeve (not shown) to prevent clad collapse. The sleeves are permanently attached to the end caps 248 by means of a tight fitting pin (not shown). The end faces of the pellets contain shallow centrally located ditches to minimize axial elongation of the stacked fuel pellets. Provision is made on one end of the fixed end cap for the respective alternative attachment of the fuel rod to the respective top and bottom base plates 264, 266, 268, 270, 272 and 274 of the seed and blanket assemblies 62, 64, and reflector module 66. The fuel rods 63, 65 and 67 are attached to base plates 264, 266, 268, 270, 272, and 274 by means of specially designed sleeve end connector nut 276 as shown in FIG. 9 which provides sufficient flexibility to accommodate the differential expansion between base plates made of Inconel and the end cap made of zircaloy as well as high relaxation which is common to zircaloy.

The fuel rods 63, 65 and 67 of the fuel and reflector modules 60 and 66 are each supported in the same basic manner in a very closely packed triangular array.

The seed support shaft 126 is affixed to a seed support shell 278 having affixed therein the top and bottom base plates 264 and 266 for fuel rod connection. The blanket support tube 120 also has the top and bottom base plates 268 and 270 affixed thereto for fuel rod connection. Similarly, reflector shell tube 240 has the top and bottom base plates 272 and 274 affixed thereto to provide for fuel rod connection. Each of the base plates 264, 266, 268, 270, 272, and 274 has a plurality of openings 280 which are used for fuel rod attachment (as described above), and as coolant flow holes. The nominal space between fuel rods is 0.065 inches in the seed assembly, 0.059 inches in the standard blanket region, 0.104 inches in the power flattened blanket regions, and 0.070 inches in the reflector assembly.

Referring to FIGS. 15–22, the support system includes grids 290, which provide lateral support of the fuel rods 63, 65 and 67 intermittingly along their length, axial positioning restraints at one end of each fuel rod and the module structure which positions and supports the components. In the fuel and reflector 60 and 66 modules illustrated in FIGS. 6 to 14, the axial restraint of the fuel rods 63, 65, and 67 is provided by attaching one end of the fuel rods to a base plate with half of the rods attached to the top base plates 264, 268, 272 and the other half attached to the bottom base plates 266, 268, 272. This arrangement provides more space for the coolant to enter the array of rods through openings 280 as flowholes in the base plates as well as balancing the loads on the grids 290.

The module can be considered as a dynamic, three-dimensional operating unit. On startup, the fuel rods 63, 65 and 67 will increase in length more than the module structure. Thus, there will be an axial movement of fuel rods towards the grids. This leads to axial forces on the grid which are largely canceled out by the top and bottom mounting of the fuel rods. In addition to thermal expansion, there is a long term length increase in the cladding made of zircaloy due to neutron radiation. This long term increase is partly compensated for by a similar increase in the modular structure. Finally, there is some fuel rod length increase due to accumulative fuel pellets to clad interactions. All of these length increases vary from rod to rod according to the radial power distribution in the core, and axially along each rod. The resistance to sliding that is caused by the friction at the interface of the fuel rods 63, 65 and 67 and the support grid 290 is reacted at the base and in turn is reacted by the support structure. These loads are in the order of 20,000 lbs. in the movable seed assembly 62, 40,000 lbs. in the blanket assembly 64 and 10,000 lbs. in the reflector modules 66.

Figures 16, 17, 20, 21:
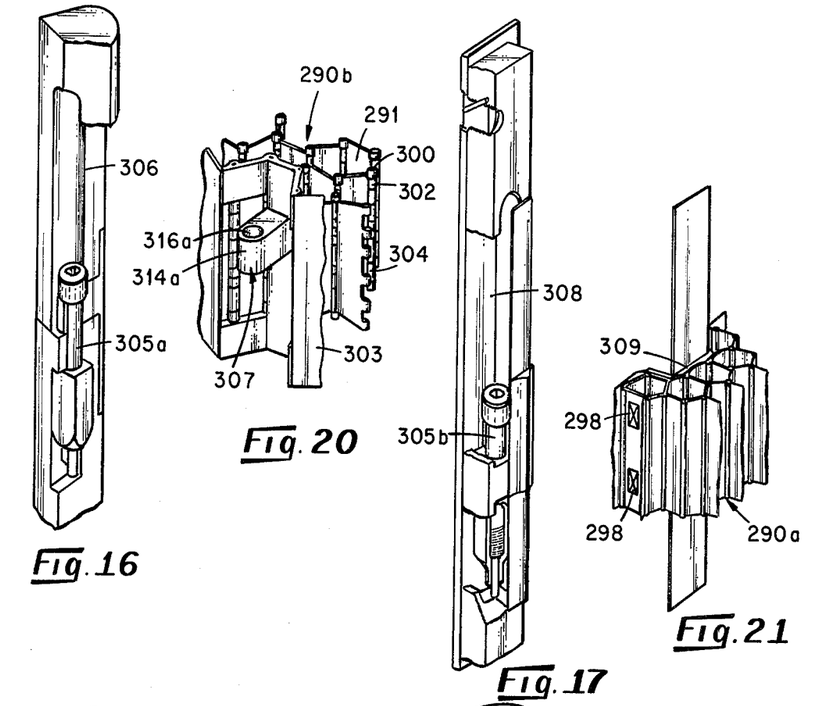
FIG. 16 is an enlarged perspective view of the Type A corner post.
FIG. 17 is an enlarged perspective view of the Type B corner post.
FIG. 20 is an enlarged perspective view of a blanket grid to Type A corner post grid attachment.
FIG. 21 is an enlarged perspective view of a seed grid and shell respectively to Type B corner post grid attachment of the seed grid.
Figure 18:
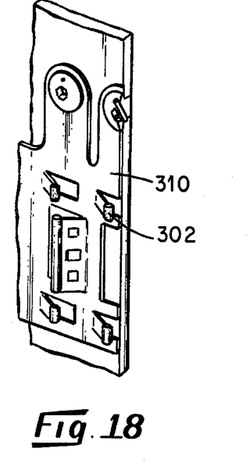
FIG. 18 is an enlarged perspective view of the Type C plate attachment for the blanket grid to guide tube.
Figures 19, 22:
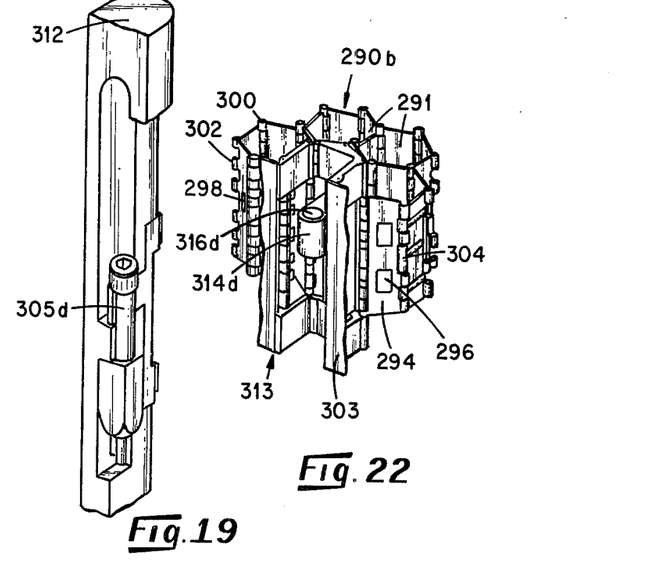
FIG. 19 is an enlarged perspective view of the Type D center post.
FIG. 22 is an enlarged perspective view of a blanket grid to Type D center post grid attachment of the blanket half-hex grid for a Type D center post.

The grids 290 are made up of a series of basic half-hex pieces 291, each piece of which forms three sides of the hexagonal fuel rod cell. The grids are a subject of a separate patent application Ser. No. 407,757 filed by Brennan et al. on Oct. 18, 1973 now under Notice of Allowability dated July 24, 1975. As shown in FIG. 22, the centerface incorporates a spring 294 facing out of the adjacent cell. A convolution 296 in the center of the spring 294 is one of the fuel rod contacts. The side faces each contain a fixed dimple 298 thus forming the other two fuel rod contact points. The seed grid 290a shown in FIG. 21 is different from the blanket and reflector grids 290b and 290c shown in FIGS. 13 and 22 since it has two axially spaced contact dimples 298 on each side of the half-hex pieces thus providing a slightly different arrangement. This alteration was necessary because of the small rod diameter. The modular cell is completed by interlocking three or more half-hex pieces 291 and securing them with hinge pins 300 which pass through the curls 302 and bends 304. Special pieces having two sides instead of three are used as boundaries as illustrated in FIGS. 20 and 22.

Figure 15:
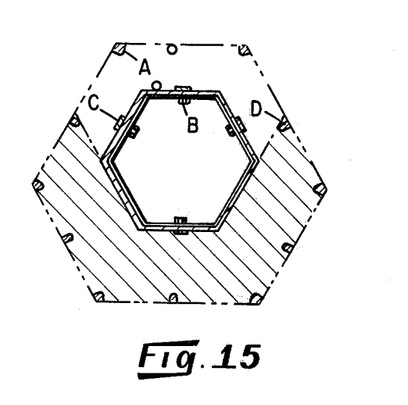
FIG. 15 is a horizontal cross sectional view of a Type III module illustrating the location of Type A, Type B, and Type D posts and Type C tab.

Straps 303 are welded to the half-hex pieces 291 to provide a strengthening edge to the grid. There are also Type A posts 306, Type B posts 308, Type C tabs 310, and Type D posts 312 positioned as connectors on the boundaries of the grids to provide the necessary attachment to the respective supporting structure as illustrated in FIG. 15. A type A post 306 is a blanket corner post having a large hinge post 305a which supports a blanket corner half-hex adapter plate 307. A type B post 308 is a center seed post having a large hing post 305b which support a seed center half-hex adapter plate 309. A type C tab 310 is a blanket center guide tube support tab having a half-hex piece and hinge pin curls 302 for blanket grid support. A type D post 312 is a blanket center post having a large hinge post 305d which supports a blanket center half-hex adapter plate 313. Adapter plates 307 and 313 have an extending flange 314 with opening 316 extending therethrough for connection to post 305 and half-hex hinge pin curls for respective grid support. These attachment points and the design of the attachment components are shown in FIGS. 16–22. The size of the posts and tabs 306, 308, 310 and 312 respectively has been kept to a minimum and is equivalent to one fuel rod in the blanket and two rods in the seed so as to minimize the volume of parasitic materials and to minimize the number of fuel rods that must be eliminated to provide the necessary support. Because of the importance of neutron economy in a breeder reactor, it is important to minimize the number of materials used in the grid and the supporting structure. This has led to the longest possible span between grids, the thinnest material and as short as possible structure.

COOLANT FLOW SYSTEM

Figure 6:
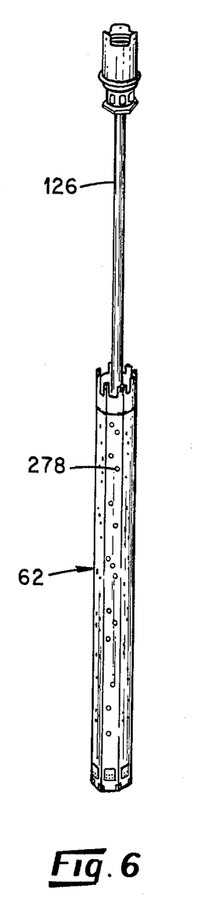
FIG. 6 is a perspective view of the seed assembly.
Figures 7, 8:
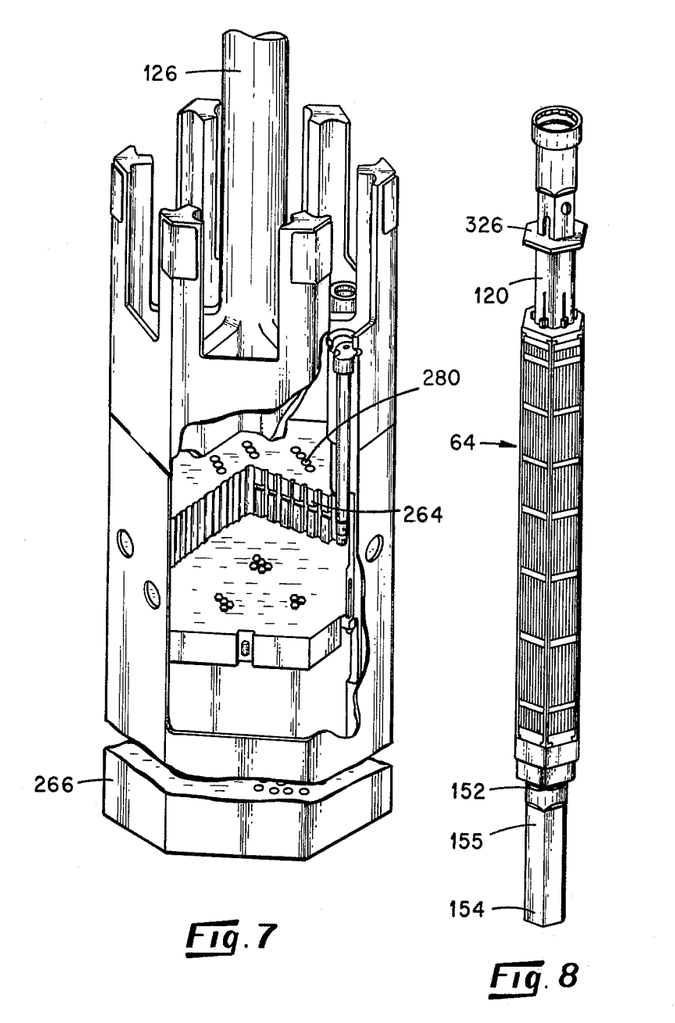
FIG. 7 is an enlarged partial cut-away view of the top portion of the seed assembly shown in FIG. 6.
FIG. 8 is a perspective view of the blanket assembly.

The reactor is cooled by a pressurized light water flowing in a single path through the entire core. As shown in the directional arrows in FIG. 1, the coolant flow through the various regions of the core is directed and controlled by full length shells 278 and 240 on reflector module 66 and seed assembly 62 respectively made of zircaloy between each fuel region and by orifices 320 in the blanket assembly 64 and reflector module 66. Each of the movable seed assemblies 62 contains a 0.080 inch thick shell 278 that extends the full length of the fuel rod 63 as shown in FIG. 6. FIG. 8 illustrates blanket support tube 120 which is provided in the blanket module 60 to form the channel through which the seed assembly 64 passes. The overall length of the shell 278 is approximately 22 feet with the central 10 feet made of zircaloy and the ends being made of stainless steel. The middle 10 feet of zircaloy minimizes the effect of parasitic neutron capture. The reflector assemblies are also surrounded by a full length zircaloy shell 240 to provide a separate flowpath for the reflector region of the core. There are no shells around the outside perimeter of the blanket assemblies 64 or between the standard and power flattened fuel rods, since they are not necessary.

Orifices 320 are located at each inlet and outlet regions of the fuel and reflector modules 60 and 66. These orifices 320 consist of three uniformly spaced perforated plates 322 with a hole pattern staggered between the plates such as there can be no direct line of sight through holes 324. The number and size of the holes 324 can thus be set by the required flow in accordance to heat transfer requirements. The specific design of the orifice plates 322 is a subject of application Ser. No. 461,316, now U.S. Pat. No. 3,878,870, filed in the names of Atherton et al.

As shown in FIG. 8, flow divider plates 326 are provided on each module at the location of the seed exit flow. These divider plates 326 are unique features of the safety injection system in that they direct cooling water into the movable seed assembly and to the centrally located blanket assemblies 64 in the case of a loss-of-coolant accident. This eliminates the need for complex piping runs through the individual module.

Instrumentation is provided within the core which includes a means of measuring neutron flux, coolant flow, and coolant temperatures. There are two basic types of instrumentation which are located in the core structural components of the core barrels and the bottom plate and module instrumentation. All of the in-module instrumentation exits through the closure head 54 whereas the other instrumentation exits through the core barrel support flange 86. The in-core instrumentation will be used only to provide information about the behavior of the core during its life and this instrumentation is not required for protectional purposes. Flowmeters 156 and 158 located at the entrance to the seed and blanket assemblies 62 and 64 which measure the rate of flow therein are the subject of a separate application Ser. No. 461,474 filed by Atherton et al. on Apr. 16, 1974 (now abandoned in favor of continuation-in-part application Ser. No. 602,707).

Listed below in the tables are design parameters for the reactor core as described previously.

TABLE I

| | |
|---|---|
| Active Core Height Including $ThO_2$ Reflector (ft) | 8.7 |
| Mean Diameter (ft) | 7.5 |
| U-233 Loading (kg) | 495.2 |
| Seed | 196.7 |
| Blanket | 298.5 |
| $ThO_2$ Loading (metric ton) | 41.472 |
| Seed | 5.192 |
| Blanket | 18.087 |
| Reflector | 18.193 |

Table II illustrates characteristics of the core loading given in Table I.

TABLE II

| | |
|---|---|
| Thermal Output Megawatts | 236.6 |
| Pressure Vessel Pressure Drop (psi) | 66.4 |
| Pressure Vessel Inlet Temperature (°F) | 520 |
| Pressure Vessel Outlet Temperature (°F) | 542 |
| Seed Thermal Output Megawatts (Maximum) | 90.6 |
| Seed Heat Transfer Coefficient (Btu/hr-ft²-°F) | 5460 |
| Heat Flux, Maximum (Btu/hr-ft² $\times 10^{-6}$) | 0.393 |
| Coolant Maximum Service Temperature (°F) | 636 |
| Coolant Flow Rate (lb/hr $\times 10^{-6}$)Total | 30.76 |
| Seed | 8.0 |
| Blanket | 16.84 |
| Reflector | 2.96 |
| Leakage Flow (lb/hr $\times 10^{-6}$) | 2.96 |

Thus has been described a mechanical design of a light water breeder reactor which accomplishes the objects set forth above. It could be understood that the invention is not to be limited to the details given herein and that it may be modified only in the scope of the claims appended hereto.

What we claim is:

1. In a light water breeder nuclear reactor comprising:
   a. a pressure vessel comprising a vessel shell with coolant inlet nozzles, coolant outlet nozzles, an interior flange located between the inlet and outlet nozzles, and a closure head having a plurality of openings therein,
   b. a core located within the vessel shell and having a plurality of fuel and reflector modules; each of said fuel modules comprising
      an elongated, vertically movable assembly having a plurality of spaced apart fuel rods defining a single seed region with coolant passages therethrough, and;
      a first elongated stationary assembly surrounding the periphery of said movable assembly and in juxtaposed relationship with at least two adjacent fuel module stationary assemblies, said stationary assembly having a plurality of spaced apart fuel rods defining a blanket region with coolant passages therethrough; and
      each of said reflector modules comprising a plurality of second elongated stationary assemblies extending about the periphery of the core, said second stationary assemblies having a plurality of spaced apart blanket fuel rods defining a reflector region having coolant passages therethrough,
   c. a core support structure within the pressure vessel, comprising:
      a core barrel support flange affixed between the pressure shell and head and having openings therethrough,
      an upper core barrel formed integrally on the core barrel support flange and having a plurality of openings therethrough, said barrel having an outwardly extending core barrel support flange,
      a lower core barrel having a closed portion and an outwardly extending lip, said lip in supported contact with the pressure vessel flange and the closed portion having a plurality of openings therethrough to define a lower plenum chamber between the pressure shell and the closed portion;
      an inlet barrel shield fixedly connected to the upper core barrel, and a bottom plate assembly connected to the inlet barrel shield barrel, said bottom plate assembly defining means for directing coolant flow from the pressure vessel inlet into the core,
   d. a plurality of control drive mechanisms for longitudinally positioning said movable assemblies, said drive mechanism comprising:
      a motor having a stator and rotor with a collapsible mechanism drive connection to a lead screw, the lead screw connected to the rotor capable of being displaced in an axially direction during the lead screw rotation;
      a motor tube surrounding the motor and affixed thereto; and
      a vessel nozzle connected to the motor tube; the improvement comprising:
   the fuel module assembly, blanket stationary assembly, and reflector module stationary assembly each comprising respectively:
   support shells;
   top and bottom base plates having a plurality of openings therethrough and connected respectively to the top and bottom of said support shells;
   means for supporting fuel rods within the assemblies alternately to the top and bottom base plates comprising:
      a. means for attaching a first half of the fuel rods at the top thereof to the top base plate openings, the bottom of said first half of the fuel rods being spaced apart from said bottom base plate;

b. means for attaching a second half of the fuel rods at the bottom thereof to the bottom base plate, the top of said second half of the fuel rods being spaced apart from said top base plates;

c. spacer grids spaced along the length of the fuel rods each of said support shells having support posts spaced along the length of said rods and adjacent to the spacer grids, said support posts and spacer grids having hinge pin attachments and hinge pins passing therethrough for connecting spacer grids to said support posts.

2. The reactor defined in claim 1, wherein the vessel nozzle is connected to the control drive mechanism and fitted with the pressure vessel head openings to support the control drive mechanism, said vessel nozzle having a radially inwardly extending ledge, and additionally including means for supporting the first stationary assembly from the control drive mechanism comprising:

a suspension sleeve having a radially outwardly extending flange supporting contact with the vessel nozzle ledge;

a compression sleeve fitting radially about said suspension sleeve and having a radially inwardly extending flange in contact with the suspension sleeve;

a breech lock sleeve filled within the compression sleeve to fixedly hold the suspension and compression sleeve to the transversing mechanism; and a blanket support tube interlocked with the suspension sleeve to support the blanket assembly.

3. The reactor defined in claim 1, additionally including means for supporting the movable assembly from the control drive mechanism lead screw comprising, a balance piston connected to the control drive mechanism lead screw, a movable assembly support shaft connected to the balance piston, and means for connecting the movable assembly support shell to the movable assembly support shaft.

4. The reactor defined in claim 1, additionally including a reflector module holddown barrel fixedly attached to the core barrel support flange radially interior to the upper core barrel, said holddown barrel extending to bear against the top of the reflector modules, said holddown barrel having a plurality of openings therethrough and defining an upper plenum chamber.

\* \* \* \* \*